United States Patent

[11] 3,624,072

| [72] | Inventor | Norbert Gruenfeld<br>Bronx, N.Y. |
|---|---|---|
| [21] | Appl. No. | 54,603 |
| [22] | Filed | July 13, 1970 |
| [45] | Patented | Nov. 30, 1971 |
| [73] | Assignee | Geigy Chemical Corporation<br>Greenburgh, N.Y.<br>Continuation-in-part of application Ser. No. 693,114, Dec. 26, 1967, and a continuation-in-part of 851,761, Aug. 20, 1969. This application July 13, 1970, Ser. No. 54,603 |

[54] DERIVATIVES OF 5H-DIBENZ[B,F] AZEPINE-4-CARBOXYLIC ACIDS
15 Claims, No Drawings

[52] U.S. Cl. ................................................... 260/239 D,
260/247.2 A, 260/247.2 R, 260/294 S, 424/35,
424/38, 424/244, 424/248, 424/267

[51] Int. Cl. .......................................................C07d 41/08,
C07d 87/40, C07d 87/42
[50] Field of Search ........................................... 260/239 D

[56] References Cited
FOREIGN PATENTS
414,643  12/1966  Switzerland .................  260/239

*Primary Examiner*—Alton D. Rollins
*Attorneys*—Karl F. Jorda and Bruce M. Collins ABSTRACT: 5H-Diebenz[b,f]azepines-4-carboxylic acid, the 10,11-dihydro and other substituted derivatives thereof are antiinflammatory agents. They can be prepared, among other ways, through treatment of the appropriate 4,5-oxalyl-5H-dibenz[b,f]azepine with aqueous base followed by hydrogen peroxide. Esterification, N-acylation and/or amidation can optionally follow. Typical embodiments are 3-methoxy-10,11-dihydro-5H-dibenz[b,f]azepine-4-carboxylic acid and 3,7-dichloro-5H-dibenz[b,f]azepine-4-carboxylic acid.

DERIVATIVES OF 5H-DIBENZ[B,F] AZEPINE-4-CARBOXYLIC ACIDS

This is a continuation-in-part of Ser. Nos. 693,114 and 851,761, filed Dec. 26, 1967 and Aug. 20, 1969 respectively. Ser. No. 693,114 is a continuation-in-part of Ser. No. 604,160 filed Dec. 23, 1966, now abandoned.

DETAILED DESCRIPTION

This invention pertains to a class of organic compounds which can be diagrammatically depicted as follows:

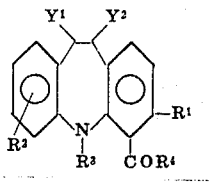

wherein
$R^1$ is hydrogen, methoxy or chloro;
$R^2$ is hydrogen, chloro or methyl;
$R^3$ is hydrogen, (lower)alkanoyl, benzoyl or chlorobenzoyl;
$R^4$ is hydroxy, amino, (lower)alkoxy, or di(lower)-alkylamino(lower)alkoxy; and
$Y^1$ and $Y^2$ taken separately are each hydrogen or taken together are a carbon-carbon bond.

This invention also pertains to the nontoxic pharmaceutically acceptable alkali metal, alkaline earth metal and organic amine salts of the compounds of formula I wherein $R^4$ is hydroxy and to the pharmaceutically acceptable acid addition salts of the compounds of formula I wherein $R^4$ is di(lower)alkylamino(lower)alkoxy.

Finally this invention encompasses methods and compositions utilizing a compound of formula I, or an above defined salt thereof, in the treatment of inflammatory conditions.

By the term "(lower)alkyl" and derivations thereof utilizing the root "alk," is intended a group comprising a monovalent branched or straight hydrocarbon chain containing from one to six carbon atoms. Representative of (lower)-alkyl groups are thus methyl, ethyl, propyl, isopropyl, butyl, sec butyl, t-butyl, pentyl, isopentyl, hexyl and the like. Embraced by the term "(lower)alkoxy" are groups containing from one to six carbon atoms and joined through an oxygen ether bond, such as methoxy, ethoxy, isopropoxy, butoxy and the like.

The compounds of formula I are anti-inflammatory agents and are accordingly useful in the treatment of those inflammatory conditions for which agents are indicated. Thus the compounds can be shown to demonstrate activity in classical anti-inflammatory laboratory models such as the carrageenin test, the turbidity test, the Whitehouse screen and the established adjuvant arthritis assay. The compounds also exhibit antipyretic and analgesic properties.

The 5H-dibenz[b,f]azepine derivatives of the present invention are administered parenterally or orally to achieve an anti-inflammatory effect, in any of the usual pharmaceutical forms. These include solid and liquid unit oral dosage forms such as tablets, capsules, powders, suspensions, solutions, syrups and the like, including sustained release preparations, and fluid injectable forms such as sterile solutions and suspensions. The term unit dosage form as used in this specification and the claims refer to physically discrete units to be administered in single or multiple dosage to animals, each unit containing a predetermined quantity of active material in association with the required diluent, carrier or vehicle. The quantity of active material is that calculated to produce the desired therapeutic effect upon administration of one or more of such units.

Powders are prepared by comminuting the 5H-dibenz-[b,f] azepine derivatives to a suitable fine size and mixing with a similarly comminuted diluent pharmaceutical carrier such as an edible carbohydrate material as for example, starch. Sweetening, flavoring, preservative, dispersing and coloring agents can also be present.

Capsules are made by preparing a powder mixture as described above and filling formed gelatin sheaths. A lubricant such as talc, magnesium stearate and calcium stearate can be added to the powder mixture as an adjuvant before the filling operation; a glidant such as colloidal silica may be added to improve flow properties; a disintegrating or solubilizing agent may be added to improve the availability of the medicament when the capsule is ingested.

Tablets are made by preparing a powder mixture, granulating or slugging, adding a lubricant and disintegrant and pressing into tablets. A powder mixture is prepared by mixing the compound, suitably comminuted, with a diluent or base such as starch, sucrose, kaolin, dicalcium phosphate and the like. The powder mixture can be granulated by wetting with a binder such as syrup, starch paste, acacia mucilage or solutions of cellulosic or polymeric materials and forcing through a screen. As an alternative to granulating, the powder mixture can be run through the tablet machine and the resulting imperfectly formed slugs broken into granules. The granules can be lubricated to prevent sticking to the tablet-forming dies by means of the addition of stearic acid, a stearate salt, talc or mineral oil. The lubricated mixture is then compressed into tablets. The medicaments can also be combined with free flowing inert carriers and compressed into tablets directly without going through the granulating or slugging steps. A protective coating consisting of a sealing coat of shellac, a coating of sugar or polymeric material and a polish coating of wax can be provided. Dyestuffs can be added to these coatings to distinguish different unit dosages.

Oral fluids such as syrups and elixirs can be prepared in unit dosage form so that a given quantity, e.g., a teaspoonful, contains a predetermined amount of the compound. Syrups can be prepared by dissolving the compound in a suitably flavored aqueous sucrose solution while elixirs are prepared through the use of a nontoxic alcoholic vehicle. Suspensions can be formulated by dispersing the compound in a nontoxic vehicle in which it is insoluble.

Fluid unit dosage forms for parenteral administration can be prepared by suspending or dissolving a measured amount of the compound in a nontoxic liquid vehicle suitable for injection such as an aqueous or oleaginous medium and sterilizing the suspension or solution. Alternatively a measured amount of the compound is placed in a vial and the vial and its contents are sterilized and sealed. An accompanying vial or vehicle can be provided for mixing prior to administration.

The compounds of the present invention wherein $R^4$ is hydroxy can be prepared from the corresponding 4-unsubstituted 5H-dibenz[b,f]azepine or 10,11-dihydro-5H-dibenz[b,f]azepine through treatment with n-butyl lithium followed by treatment of the reaction product with solid carbon dioxide (dry ice). Alternatively the 4-unsubstituted 5H-dibenz[b,f]azepine or 10,11-dihydro-5H-dibenz[b,f]azepine is first treated with oxalyl chloride and aluminum chloride to yield a 4,5-oxalyl-5H-dibenz[b,f]azepine, or the corresponding 10,11-dihydro compound, which is then treated with aqueous base and oxidized with aqueous hydrogen peroxide.

Those compounds where $R^4$ is (lower)alkoxy are obtained from the corresponding 4-carboxylic acids through conventional esterification techniques, e.g., treatment of the acid or an acid chloride thereof with a (lower)alkanol; use of diazoalkanes; transesterification of one (lower)alkyl ester, preferably the methyl or ethyl ester, with a higher alkanol in the presence of a basic catalyst; and the like. The di(lower)alkylaminoalkyl esters of formula I are preferably obtained through treatment of the acid chloride with a di(lower)alkylamino(lower)alkanol or through treatment of the acid itself (or an alkali metal salt thereof) with a di(lower)alkylaminoalkyl halide, such as the chloride, bromide or iodide.

The compounds of formula I wherein $R^4$ is amino are prepared by ammonolysis of the corresponding compounds where $R^4$ is (lower)alkoxy, preferably methoxy, through treatment of a suspension of the esters in a mixture of a (lower)alkanol, preferably one corresponding to the ester moiety of the acid, and a hydrocarbon solvent, such as benzene or toluene with gaseous ammonia.

Alternatively, the chlorides of the acids of formula I ($R^4$=OH) can be treated with ammonia to yield these amides.

The compounds of formula I in which $R^3$ is (lower)alkanoyl, benzoyl or chlorobenzoyl are prepared by conventional acylation methods. In those cases where $R^4$ is hydroxy, this acylation is effected through use of an appropriate acid anhydride which is allowed to react with a 5-unsubstituted compound ($R^3$=H) under reflux conditions. When $R^4$ is (lower)alkoxy, the 5H-dibenz[b,f]azepine is first treated with a strong base such as sodium hydride, lithium hydride, n-butyl lithium or the like, and then treated with a chloride of the acid from which the group $R^3$ is derived.

The compounds of formula I where $R^4$ is amino and $R^3$ is other than hydrogen are preferably obtained through acylation of the nitrogen atom in the 5-position of the corresponding 4-carboxylic acid (or ester thereof), followed by formation of the 4-carboxamide as described above.

One important embodiment of the present invention, particularly for preparing solid pharmaceutical formulations is the pharmaceutically acceptable nontoxic acid addition salts of these compounds in which $R^4$ is di(lower)alkylaminoalkoxy. Such pharmaceutically acceptable nontoxic salts include those derived from both organic and inorganic acids such as, without limitation, hydrochloric, hydrobromic, sulfuric, phosphoric, methanesulfonic, acetic, lactic, succinic, malic, maleic, aconitic, phthalic, tartaric, embonic, enanthic and like acids.

Another important embodiment of the present invention is the pharmaceutically acceptable nontoxic sodium, potassium, calcium, ammonia and organic amines salts of these compounds in which $R^4$ is hydroxy. Such amines include ethylamine, triethylamine, ethanolamine, diethylaminoethanol, ethylenediamine, piperidine, morpholine, 2-(piperidino)ethanol, benzylamine, procaine and the like.

The following examples set forth the manner and process of making typical embodiments of the invention, without being a limitation thereof, and include the best mode contemplated for carrying out the invention. In these examples temperature is expressed on the Centigrade scale.

EXAMPLE 1

10,11-Dihydro-5H-dibenz[b,f]azepine-4-carboxylic Acid

Iminodibenzyl (0.085 mole, 16.6 g.) is added to a solution of n-butyl lithium (0.26 mole, 162 ml. of 1.6 N solution in hexane) and anhydrous ether (200 ml.), precooled in an ice-salt bath, under nitrogen atmosphere. The mixture is stirred in an ice bath for 3 hours and subsequently at room temperature for 63 hours under nitrogen atmosphere. The mixture is then poured on a slurry of dry ice and ether and is allowed to react for 2 hours. Water (400 ml.) is added, the aqueous layer is separated and the ethereal layer is further extracted with water (3×50 ml.); the aqueous extracts are washed well with ether and then rendered acidic (pH 1) with 3N hydrochloric acid. Reextraction with ether yields the desired acid (10.5 g., m.p. 222°–227°). Two recrystallizations from benzene (600 ml.) yield 7.50 g., m.p. 226°–228° (dec.).

Analysis
Calcd.: C, 75.30; H, 5.47; N, 5.86
Found: C, 75.22; H, 5.55; N, 5.74

EXAMPLE 2

3-Methoxy-10,11-dihydro-5H-dibenz[b,f]azepine-4-carboxylic Acid a. 3-Methoxyiminodibenzyl A solution of 5-acetyl-3-methoxyiminodibenzyl (50 g.) in 650 ml. of 3N potassium hydroxide in 90 percent ethanol is heated under reflux for 18 hours under a nitrogen atmosphere. The solution is then evaporated to dryness and the residue is dissolved in a mixture of water (200 ml.) and methylene chloride (200 ml.). The methylene chloride solution is separated and the aqueous layer is further extracted with methylene chloride. The combined methylene chloride extracts are washed with water, dried over sodium sulfate and evaporated to dryness to give the crude product (42.0 g. m.p. 92°–95°). Recrystallization from heptane gives purer compound (37.4 g., m.p. 95°–98°).

b. 3-methoxy-10,11-dihydro-5H-dibenz[b,f]azepine-4-carboxylic acid

3-Methoxyiminodibenzyl (0.05 mole, 11.30 g.) is added to a mixture of n-butyl lithium (0.15 mole, 94 ml. of 1.6 N solution in hexane) and anhydrous ether (150 ml.) precooled to −10° in an ice-acetone bath under a nitrogen atmosphere. The reaction mixture is allowed to reach room temperature over a period of 45 minutes and then stirred at this temperature for 3½ hours. The reaction mixture is poured on a slurry of dry ice in anhydrous ether (250 ml.) and the resulting mixture is allowed to react overnight. Water (300 ml.) is added and the mixture is then filtered, the solid being washed well with water and ether. The aqueous layer of the mother liquor is separated. The ether layer is reextracted with water and the aqueous solution is washed well with ether. The insoluble lithium salt collected by the previous filtration is resuspended in the aqueous solution and the mixture is rendered acidic (pH 1) with 3N hydrochloric acid and stirred well with 500 ml. of methylene chloride until complete solution is obtained; additional 3N hydrochloric acid is added to maintain a pH of from 1 to 2. The methylene chloride layer is separated and the aqueous layer is further extracted with methylene chloride (2×200 ml.). The combined methylene chloride extracts are washed with water, dried over sodium sulfate and evaporated to dryness to give a semisolid residue (16.4 g.). Recrystallization from benzene-cyclohexane (1:1, 100 ml.) gives 11.4 g. of the desired compound; m.p. 158°–160°. One additional recrystallization from benzene (60 ml.) gives 10.1 g. of the compound, m.p. 157°–160°.

Analysis
Calcd.: C, 71.36; H, 5.61; N, 5.20
Found: C, 71.19 H, 5.54; N, 5.37

EXAMPLE 3

5H-Dibenz[b,f]azepine-4-carboxylic acid a. A suspension of 50 g. of 5H-dibenz[b,f]azepine in 310 ml. of anhydrous ether is added to a refluxing solution of 56.8 g. of oxalyl chloride in 189 ml. of anhydrous ether. The resultant solution is heated at reflux for 3½ hours and then evaporated to dryness under reduced pressure and anhydrous conditions. A mixture of 75.47 g. of the residue in 1,265 ml. of carbon disulfide is heated for 5 hours at reflux under a nitrogen atmosphere while 63.2 g. of aluminum chloride are added in five portions. When the addition is complete, the mixture is stirred at reflux for 15 hours and then cooled and filtered. The solid thus collected is treated with cooling first with 253.5 ml. of concentrated hydrochloric acid and then with 253.5 ml. of water, after which it is extracted with 2 liters of chloroform. These extracts are dried over sodium sulfate and evaporated to dryness. The residue is crystallized from benzene with clarification to yield 4,5-oxalyl-5H-dibenz[b,f]azepine, m.p. 148°–150° C.

In a similar fashion, starting with 3-chloro-5H-dibenz[b,f]azepine and 3,7-dichloro-5H-dibenz[b,f]azepine, there are respectively obtained 4,5-oxalyl-7-chloro-5H-dibenz[b,f]azepine, m.p. 246°–248° C. and 4,5-oxalyl-3,7-dichloro-5H-dibenz[b,f]azepine, m.p. 250°–255° C.

b. To a solution of 40.4 g. of sodium hydroxide in 387 ml. of water are added 36.34 g. of 4,5-oxalyl-5H-dibenz-[b,f]azepine. This mixture is stirred for 30 minutes at room temperature and then diluted with 2,750 ml. of water. After being stirred at room temperature for an additional hour, this mixture is treated in a dropwise fashion with 36.6 ml. of 30 percent hydrogen peroxide in 366 ml. of water. This reaction is stirred at room temperature for 3 hours and then heated at reflux for 45 minutes. After being cooled, the solution is washed with ether, rendered acidic to pH 1 with concentrated hydrochloric acid and filtered. The solid thus collected is crystallized from ethanol with charcoal clarification to yield 5H-dibenz-[b,f]azepine-4-carboxylic acid, m.p. 243°–245°'C.

In a similar fashion, there is obtained from 4,5-oxalyl-7-chloro-5H-dibenz[b,f]azepine and 4,5-oxalyl-3,7-dichloro-5H-dibenz[b,f]azepine, 7-chloro-5H-dibenz-[b,f]azepine-4-carboxylic acid, m.p. 249°–250° C. and 3,7-dichloro-5H-dibenz[b,f]azepine-4-carboxylic acid, m.p. 166°–168° C.

EXAMPLE 4

7-Chloro-10,11-dihydro-5H-dibenz-[b,f]azepine-4-carboxylic Acid a. A solution of 3-chloroiminodibenzyl (0.05 mole, 11.50 g.) in anhydrous ethyl ether (61 ml.) is added dropwise to a refluxing solution of oxalyl chloride (0.086 mole, 10.95 g.) in anhydrous ether (37 ml.) over a period of 15 minutes. The dark mixture is heated under reflux for 3½ hours and evaporated to dryness under anhydrous conditions. The resulting residue is dissolved in carbon disulfide (245 ml.). Aluminum chloride (12.25 g.) is added in five portions over a period of 5 hours. After each addition, the mixture is heated under reflux with vigorous stirring for 15 hours. The mixture was cooled and the resulting solid is collected. Concentrated hydrochloric acid (49.5 ml.) is added to the cooled solid with stirring and the suspension is diluted with water (50 ml.) and chloroform (1 liter) with stirring. The chloroform layer is separated, washed with water, dried over sodium sulfate and evaporated to dryness to give dark brown solid (12.1 g., m.p. 207°–213° dec.). Recrystallization from benzene (100 ml., G-60 charcoal-yields pure 4,5-oxalyl-7-chloro-10,11-dihydro-5H-dibenz-[b,f]azepine (8.9 g.) m.p. 217°–221° C.

Analysis for $C_{16}H_{10}ClNO_3$
Calcd.:   C, 67.73;   H, 3.56;   N, 4.94;   Cl, 12.49
Found:    C, 68.01;   H, 3.46;   N, 5.20;   Cl, 12.40 b. The compound obtained in part a (9.70 g.) is stirred at room temperature with a solution of aqueous sodium hydroxide (9.36 g.) in 89 ml. of water for half-an-hour. The mixture is then diluted with water (630 ml.) and stirred for an additional hour. A solution of 8.5 ml. of 30 percent hydrogen peroxide in 85 ml. of water is added over a period of 5 minutes and the reaction mixture is then stirred at room temperature for 2 hours and next heated under reflux for 2 hours. The solution is cooled, washed with ether and rendered acidic (pH 1) with 3N hydrochloric acid. The suspension is then extracted with ether and the ethereal extracts are dried over sodium sulfate and evaporated to dryness to give crude produce (8.82 g.), m.p. 211°–214° C. dec. Two recrystallizations from benzene (150 ml.) with clarification yields the desired compound. (5.48 g.), m.p. 220°–222° C. (dec.).

Analysis for $C_{15}H_{12}ClNO_2$
Calcd.:   C, 65.82;   H, 4.42;   N, 5.12;   Cl, 12.95
Found:    C, 65.83;   H, 4.31;   N, 5.28;   Cl, 12.72

EXAMPLE 5

6-Methyl-10,11-dihydro-5H-dibenz[b,f]azepine-4-carboxylic Acid a. 60 grams of aluminum chloride in 450 ml. of anhydrous ether are added with stirring to a solution of 17.1 g. of lithium aluminum hydride in 900 ml. of anhydrous ether. The reaction mixture is heated so that the ether dissolves 43.2 g. of iminodibenzyl-4-carboxylic acid contained in a Soxhlet thimble. After extracting overnight, 450 ml. of water and subsequently 360 ml. of 6N sulfuric acid are cautiously added at a temperature of from 0° to 5° C. with ice cooling). The ethereal phase is separated, washed with water, dried over sodium sulfate and distilled to yield as a residue, 36 g. of a yellow oil which slowly crystallizes. After recrystallization from hot petroleum ether, the product, 4-methyliminodibenzyl, melts at 52° to 53° C.

b. A solution of 4-methyliminodibenzyl (0.1595 mole, 33.28 g.) in anhydrous ethyl ether (240 ml.) is added dropwise to a refluxing solution of oxalyl chloride (0.275 mole, 35 g.) in anhydrous ethyl ether (159.5 ml.).

The dark mixture is heated under reflux for 3½ hours and evaporated to dryness under anhydrous conditions. The resulting residue (48.32 g., m.p. 126°–129° C.) is dissolved in carbon disulfide (782 ml.). Aluminum chloride (39.1 g.) is added in five portions over 5 hours. After each addition, the mixture is heated under reflux with vigorous stirring. Heating under reflux is continued for 15 hours after the addition is complete. The mixture is cooled and the resulting solid collected. Concentrated hydrochloric acid (156.5 ml.) is added with stirring to the cooled solid and the suspension is diluted with water (156.5 ml.). Chloroform (750 ml.) is then added with stirring. The chloroform layer is separated, washed with water, dried over sodium sulfate and evaporated to dryness to give a solid. (37.87 g., m.p. 140°–150° C). Recrystallization from benzene (250 ml.) with clarification gives pure 4,5-oxalyl-6-methyl-10,11-dihydro-5H-dibenz[b,f]azepine, (m.p. 189°–191° C., 15.38 g.).

Analysis for $C_{17}H_{13}NO_3$
Calcd.:   C, 77.55;   H, 4.98;   N, 5.32
Found:    C, 77.84;   H, 5.32;   N, 5.19 c. The product of part b (0.005 mole, 1.31 g.) is stirred at room temperature with a solution of aqueous sodium hydroxide (1.37 g. in 13.05 ml. water) for one-half hour. The mixture is diluted with water (93.2 ml.) and stirred an additional hour. A solution of 1.24 ml. of 30 percent hydrogen peroxide in 12.4 ml. water is added dropwise and the mixture is stirred at room temperature for 1 hour and heated under reflux for 5 hours. The yellow solution is cooled, washed with ether and rendered acidic (pH 1) with 3N hydrochloric acid. The suspension is extracted with ether (2×100 ml.). The ether extract is dried over sodium sulfate and evaporated to dryness to give crude product (1.16 g., m.p. 178°–182° C.). Recrystallization of the product from benzene (100 ml.) with clarification, followed by an additional recrystallization from benzene (100 ml.) gives the desired compound, m.p. 188°–190° C.

Analysis for $C_{16}H_{15}NO_2$
Calcd.:   C, 75.87;   H, 5.97;   N, 5.53
Found:    C, 75.90;   H, 6.02;   N, 5.50

EXAMPLE 6

Methyl 10,11-dihydro-5H-dibenz[b,f]azepine-4-carboxylate 10,11-Dihydro-5H-dibenz[b,f]azepine-4-carboxylic acid (0.025 mole, 6.0 g.) is dissolved in dry tetrahydrofuran (150 ml.). The solution is cooled in a salt-ice bath mixture, ethereal diazomethane (ca. 0.05 mole) is added and the solution is kept at ice-bath temperature for 15 minutes. Additional diazomethane (ca. 0.025 mole) is added and the solution is allowed to reach room temperature (ca. one-half hour); glacial acetic acid is added to destroy excess diazomethane and the solution is evaporated to dryness to give crude product; this is suspended in water, the aqueous solution is rendered basic with sodium carbonate solution to pH 9, and immediately extracted with chloroform. The chloroform solution is evaporated to dryness and the residue is twice distilled under high vacuum to give 5.0 g. of the ester, m.p. 38°–40° C., b.p. 145°–148° C./0.1 mm. The compound exists in two crystalline forms melting at 38°–40° C. and 64°–66° C. The higher melting form is obtained by distilling the above crude product under high vacuum and seeding the melt of the lower melting compound with a sample (m.p. 60°–64° C.) thereof.

Analysis,
Calcd.:   C, 75.87;   H, 5.97;   N, 5.53
Found:    C, 75.84;   H, 5.67;   N, 5.50

Alternatively, thionyl chloride (3.2 g.) is added dropwise to an icencooled suspension of 10,11-dihydro-5H-dibenz[b,f]azepine-4-carboxylic acid (0.96 g.) in one-half benzene (5 ml.). The resulting mixture is heated under reflux for 1 hour and excess thionyl chloride and benzene are removed under reduced pressure. The residue is resuspended in benzene and the suspension is again evaporated to dryness under reduced pressure. This residue is redissolved in anhydrous benzene (5 ml.) and the solution is cooled in an ice bath while a mixture of triethylamine (0.81 g.), methanol (0.26 g.) and anhydrous benzene (3 ml.) is added dropwise. The reaction mixture is stirred at room temperature for 1/2 hour and subsequently under reflux for 1 hour. The reaction mixture is evaporated to dryness, the residue is suspended in water (25 ml.) and the pH is adjusted to 9—9 with saturated sodium bicarbonate solution. The mixture is then extracted with methylene chloride and these extracts are washed with water, dried over sodium sulfate and evaporated to dryness to give an oil (1.2 g.). This is distilled under high vacuum to give 0.3 g. of the desired compound, b.p. 144° C./0.1 mm.

As a second alternative method, concentrated sulfuric acid (67.5 ml.) is slowly added to an ice-cooled suspension of 10,11-dihydro-5H-dibenz[b,f]azepine-4-carboxylic acid chloride (28.4 g.) in anhydrous methanol (855 ml.) under vigorous stirring. The resulting mixture is heated under reflux for 45 hours. Methanol is removed by evaporation under reduced pressure. The residue is extracted with ethyl ether (4×300 ml.). The ether extract is first washed with water (300 ml.), then with 10 percent potassium carbonate solution (3×80 ml.) and finally with water (200 ml.). The ether extract is dried over sodium sulfate and evaporated to dryness to give the desired ester (oil, 25.9 g.). This is distilled under high vacuum to give purer product (23.9 g., b.p. 170°–180° C./0.03 mm. Hg). Recrystallization from isopropanol (100 ml.) gives 21.5 g. of the desired product, m.p. 63°–64° C.

Analysis.
Calcd.:  C, 75.87;  H, 5.97;  N, 5.53
Found:   C, 76.08;  H, 6.26;  N, 5.65

EXAMPLE 7

β-Diethylaminoethyl 10,11-dihydro-5H-dibenz[b,f]azepine-4-carboxylate Hydrochloride a. N,N-Diethylaminoethyl chloride N,N-Diethylaminoethyl chloride hydrochloride is added to excess 50 percent potassium carbonate solution and this is repeatedly extracted with ether. The ether solution is dried over anhydrous potassium carbonate and subsequently over potassium hydroxide and evaporated to dryness under water vacuum at room temperature; the oil is stored in freezer until used.

b. β-Diethylaminoethyl 10,11-Dihydro-5H-dibenz[b,f]azepine-4-carboxylate Hydrochloride A solution of diethylaminoethyl chloride (0.033 mole, 4.49 g.) and 10,11-dihydro-5H-dibenz[b,f]azepine-4-carboxylic acid (0.03 mole, 7.17 g.) in isopropanol (60 ml.) is heated under reflux for 15 hours. The product (9.45 g., m.p. 176°–178° C.) crystallizes on cooling. Recrystallization from isopropanol (60 ml.) with clarification yields a yellow compound (9.0 g., m.p. 177.5–178.5° C.). This is suspended in water (85 ml.) and ether (100 ml.); the suspension rendered basis (pH 9) with saturated sodium carbonate solution and agitated until complete solution is achieved, saturated sodium carbonate solution being added to maintain pH at 9. The ether layer is separated and the aqueous layer is extracted with additional ether (2×50 ml.). The combined ether extracts are washed with water, dried over sodium sulfate and evaporated to dryness to give an oil (6.7 g.). This is distilled under high vacuum to give the ester. Yield: 6.20 g., b.p. 215° C./0.15 mm. Hg.

The ester is dissolved in isopropanol (30 ml.) and ethanolic hydrochloric acid (3 ml., 7.1 N) is added to the cooled solution, crystallization occurring immediately. Recrystallization from isopropanol (ethanolic hydrogen chloride being added before crystallization starts) gives 6.3 g. of the hydrochloride, m.p. 178°–180° C.

Analysis.
Calcd.:  C, 67.28;  H, 7.26;  N, 7.47;  Cl, 9.46
Found:   C, 67.52;  H, 7.37;  N, 7.32;  Cl, 9.63

EXAMPLE 8

3-(Dimethylamino)propyl 10,11-dihydro-5H-dibenz[b,f]azepine-4-carboxylate Hydrochloride a. N,N-Dimethyl-3-chloropropylamine N,N-dimethyl-3-chloropropylamine hydrochloride is added to excess 50 percent potassium carbonate solution and this is repeatedly extracted with ether. The ether extracts are dried first over anhydrous potassium carbonate and then over potassium hydroxide and is next evaporated to dryness under vacuum at room temperature to yield the intermediate as an oil, which is stored in freezer until used.

b. 3-(Dimethylamino)propyl 10,11-Dihydro-5H-dibenz[b,f]azepine-4-carboxylate Hydrochloride A mixture of crude N,N-dimethyl-3-chloropropylamine (0.011 mole, 1.34 g.), 10,11-dihydro-5H-dibenz[b,f]azepine-4-carboxylic acid (0.01 mole, 2.39 g.) and isopropanol (20 ml.) is heated under reflux for 18 hours. The resulting solution is cooled and the product (1.45 g., m.p. 204°–206° C. dec.) crystallizes. It is twice recrystallized from isopropanol (30 ml.) with charcoal clarification to give 1.0 g. of the desired product, m.p. 209°–210° C. (dec.).

Analysis.
Calcd.:  C, 66.56;  H, 6.98;  Cl, 9.82;  N, 7.76
Found:   c, 66.47;  H, 6.88;  Cl, 9.96;  N, 7.71

EXAMPLE 9

10,11-Dihydro-5H-dibenz[b,f]azepine-4-carboxamide

A suspension of methyl 10,11-dihydro-5H-dibenz[b,f]azepine-4-carboxylate (0.01 mole, 2.5 g.) in a mixture of methanol (50 ml.) and benzene (25 ml.) is saturated with anhydrous ammonia at ice-bath temperature in a pressure bottle and is agitated at room temperature for 10 days. The resulting suspension is evaporated to dryness. Recrystallization of the residue from benzene gives the desired compound (0.5 g., m.p. 179°–181° C.). After further recrystallization from benzene (25 ml.), the compound melts at 183°–184° C.

Analysis.
Calcd.:  C, 75.60;  H, 5.92;  N, 11.76
Found:   C, 75.66;  H, 5.73;  N, 11.95

Alternatively, a solution of 10,11-dihydro-5H-dibenz[b,f]azepine-4-carboxylic acid (0.01 mole, 2.39 g.) in anhydrous benzene (10 ml.) and phosphorus trichloride (4 ml.) is heated under reflux for 2 hours. The resulting mixture is evaporated to dryness under pressure, anhydrous benzene (10 ml.) is added and the solution is again evaporated to dryness. The residue is dissolved in anhydrous ether (10 ml.); anhydrous ammonia is introduced into the solution at ice-bath temperature for 18 hours. The yellow suspension is diluted with water and methylene chloride and the pH is adjusted to 9 with saturated sodium carbonate solution. The methylene chloride layer is separated, the aqueous solution is reextracted with methylene chloride, the combined methylene chloride extracts are dried over sodium sulfate and evaporated to dryness to give the desired compound (1.82 g., m.p. 180°–182° C.) Recrystallization from benzene (50 ml.) gives pure amide (1.25 g., m.p. 182°–184° C.).

EXAMPLE 10

5-Acetyl-10,11-dihydro-5H-dibenz[b,f]azepine-4-carboxamide

A solution of 10,11-dihydro-5H-dibenz[b,f]azepine-4-carboxylic acid (0.05 mole, 11.95 g.) and anhydrous sodium acetate (0.0075 mole, 0.60 g.) in acetic anhydride (57.5 ml.) is heated under reflux for 3 hours. Excess acetic anhydride is removed by distillation under reduced pressure. The residue is dissolved in 25 ml. of pyridine and 25 ml. of water and the mixture is heated at 85° C. for 1 hour. The ice-cooled mixture is rendered acidic (pH 3) with 6N hydrochloric acid and the suspension is extracted with methylene chloride (3×100 ml.). The methylene chloride extract is washed with water, dried over sodium sulfate and evaporated to dryness to yield foam (16.2 g.) which is crystallized from ethyl ether (250 ml.) to yield the acid (14.3 g., m.p. 196°–199° C. dec.). This is dissolved in saturated sodium bicarbonate solution (200 ml.), the resulting solution is clarified with charcoal, filtered, washed with ethyl ether and rendered acidic with 20 percent acetic acid (pH 5.5). The dark material which separates is removed by filtration, the solution is clarified with charcoal, filtered and adjusted to pH 2 with 6N hydrochloric acid. The resulting suspension is extracted with methylene chloride (2×150 ml.) and these extracts are washed with water, dried over sodium sulfate and evaporated to almost dryness under reduced pressure to yield an oil which crystallizes upon the addition of anhydrous ethyl ether (30 ml.). Yield: 8.8 g., m.p. 200°–203° C. (dec.).

Analysis.
Calcd.:   C, 72.58;   H, 5.37;   N, 4.98
Found:    C, 72.72;   H, 5.62;   N, 5.01

Alternatively, phosphorus pentachloride (0.032 mole, 6.75 g.) is added to an ice-cooled suspension of 5-acetyl-10,11-dihydro-5H-dibenz[b,f]azepine-4-carboxylic acid (0.027 mole, 8.35 g.) in anhydrous benzene (270 ml.). The suspension is stirred at room temperature for 18 hours. Anhydrous ammonia is bubbled through the solution; the exothermic reaction being cooled by an ice bath. After saturation, the mixture is stirred at room temperature for 1 hour and resaturated with ammonia. After stirring at room temperature for 2 hours, the mixture is poured into 250 ml. of ice water. The benzene layer is separated and the aqueous suspension is thoroughly extracted with methylene chloride. The combined methylene chloride-benzene extracts are washed with water, dried over sodium sulfate and evaporated to dryness to give impure product (7.4 g., m.p. 134°–138° C. dec. Two recrystallizations from benzene (60 ml.) give 1.80 g., of the desired compound, m.p. 190°–191° C. (dec.).

Analysis.
Calcd.:   C, 72.84;   H, 5.75;   N, 9.99
Found:    C, 73.14;   H, 5.82;   N, 9.69

EXAMPLE 11

Methyl 5-p-Chlorobenzoyl-10,11-dihydro-5H-dibenz[b,f]azepine-4-carboxylate n-Butyl lithium (0.0055 mole, 3.4 ml. of 1.6 N solution in hexane) is added dropwise to a solution of methyl 10,11-dihydro-5H-dibenz[b,f]azepine-4-carboxylate (0.0050 mole, 1.27 g.) in anhydrous ether (15 ml.) at −10°. The reaction mixture is stirred at −10° for 5 minutes and cooled to −70° with a dry ice-acetone bath. p-Chloro-benzoyl chloride (0.0050 mole, 0.91 g.) is added dropwise with stirring. The reaction mixture is stirred at −70° C. for 3 hours and then allowed to reach room temperature over several hours. After additional ether is added, the suspension is filtered and the ethereal solution is evaporated to dryness. The residue is suspended in hexane, and the hexane insoluble material is removed by filtration; yield, 0.52 g., m.p. 157°–163°. Recrystallization from 5 ml. of isopropanol with charcoal clarification gives the desired compound (0.39 g., m.p. 170°–173° C.). One additional recrystallization from isopropanol gives 0.27 of the ester, m.p. 173°–175° C.

Analysis.
Calcd.:   C, 70.50;   H, 4.63;   N, 3.57;   Cl, 9.05
Found:    C, 70.30;   H, 4.83;   N, 3.55;   Cl, 8.98

EXAMPLE 12

10,11-Dihydro-5-(p-chlorobenzoyl)-5H-dibenz[b,f]azepine-4-carboxylic Acid

A solution of methyl 10,11-dihydro-5-(p-chlorobenzoyl)-5H-dibenz[b,f]azepine-4-carboxylate (0.217 mole, 8.5 g.) in a mixture of 0.5 N sodium hydroxide (425 ml.) and 250 ml. ethanol is heated under reflux for 1 hour. The ethanol is removed by distillation under vacuum and the aqueous solution is washed with ether, rendered acidic to pH 1–2 with 3 N hydrochloric acid with cooling and reextracted with ether. The ethereal extract is washed with water, dried over sodium sulfate and evaporated to dryness to give the crude acid (7.0 g., m.p. 206°–208° C.). Recrystallization from benzene gives the desired compound (6.7 g., m.p. 208°–210° C.).

Analysis for $C_{22}H_{16}ClNO_3$
Calcd.:   C, 69.93;   H, 4.27;   N, 3.71;   Cl, 9.39
Found:    C, 70.01;   H, 4.46;   N, 3.88;   Cl, 9.13

EXAMPLE 13

5H-Dibenz[b,f]azepine-4-carboxylic acid Triethylamine salt

To 0.5 g. of 5H-dibenz[b,f]azepine-4-carboxylic acid in 25 ml. of methanol is added 1 ml. of triethylamine. The mixture is evaporated to dryness and the residue recrystallized from ethyl acetate to yield the product, m.p. 126°–129° C.

EXAMPLE 14

| Ingredient | Quantity/capsule |
|---|---|
| 3,7-Dichloro-5H-dibenz[b,f]azepine-4-carboxylic acid | 10 mg. |
| Corn starch U.S.P. | 50 mg. |

The foregoing ingredients are mixed and introduced into a two-piece No. 1 hard gelatin capsule. Salts of the active ingredient can alternatively be employed.

EXAMPLE 15

| Ingredient | Quantity/tablet |
|---|---|
| 5H-Dibenz[b,f]azepine-4-carboxylic acid | 25 mg. |
| Corn starch U.S.P. | 130 mg. |
| Lactose | 160 mg. |
| Cab-O-Sil M-5 colloidal silica | 4 mg. |
| Gelatin U.S.P. | 5 mg. |
| Magnesium Stearate U.S.P. | 1 mg. |

The foregoing ingredients are thoroughly mixed and pressed into tablets suitable for oral administration of 25 mg. of active ingredient. The tablets may be scored to permit administration of fractional doses.

EXAMPLE 16

| Ingredients | g. |
|---|---|
| β-Diethylaminoethyl 10,11-dihydro-5H-dibenz[b,f]azepine-4-carboxylate Hydrochloride | 100.0 |
| Lactose | 80.0 |
| Corn starch | 70.0 |
| Soluble starch | 15.0 |
| Magnesium Stearate | 5.0 |
| | 270.0 |

The first three ingredients are thoroughly mixed, granulated with an aqueous solution of the soluble starch, dried, mixed with magnesium stearate and pressed into 270.0 milligram tablet cores.

Each tablet core contains 100.0 milligrams of the active substance and is sugar coated according to the usual art practices. Color may be added to the coating.

EXAMPLE 17

| Ingredients | g. |
|---|---|
| β-Diethylaminoethyl 10,11-dihydro-5H-dibenz[b,f]azepine-4-carboxylate Hydrochloride | 10.0 g. |
| Chlorobutanol | 3.0 g. |
| Water for injection q.s. | ad 1,000 cc. |

The first two ingredients are dissolved in the third, sterilized and filled into vials and multiple dose parenteral solution vials.

EXAMPLE 18

One hundred milligrams of 7-chloro 10,11-dihydro-5H-dibenz[b,f]azepine-4-carboxylic acid and 200 mg. of corn starch U.S.P. are mixed and introduced into a two-piece hard gelatin No. 1 capsule.

What is claimed is:
1. A compound of the formula:

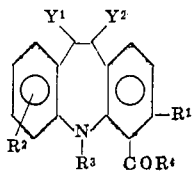

wherein
R$^1$ is hydrogen, methoxy or chloro;
R$^2$ is hydrogen, chloro or methyl;
R$^3$ is hydrogen, (lower)alkanoyl, benzoyl or chlorobenzoyl;
R$^4$ is hydroxy, amino, (lower)alkoxy, or di(lower)-alkylamino(lower)alkoxy; and
Y$^1$ and Y$^2$ taken separately are each hydrogen or taken together are a carbon-carbon bond.

2. The pharmaceutically acceptable alkali metal, alkaline earth metal and organic amine salts of a compound according to claim 1 wherein R$^4$ is hydroxy.

3. The pharmaceutically acceptable acid addition salts of a compound according to claim 1 wherein R$^4$ is di(lower)alkylaminoalkoxy.

4. A compound according to claim 1 wherein R$^1$ is hydrogen or methoxy, R$^2$ and R$^3$ are hydrogen, R$^4$ is hydroxy or (lower)alkoxy and Y$^1$ and Y$^2$ are each hydrogen.

5. A compound according to claim 1 wherein R$^1$ and R$^2$ are hydrogen or chloro, R$^2$ is in the 7-position, R$^3$ is hydrogen, R$^4$ is hydroxy and Y$^1$ and Y$^2$ taken together are a carbon-carbon bond.

6. The compound according to claim 1 which is 10,11-dihydro-5H-dibenz[b,f]azepine-4-carboxylic acid.

7. The compound according to claim 1 which is β-diethylaminoethyl 10,11-dihydro-5H-dibenz[b,f]azepine-4-carboxylate.

8. The compound according to claim 1 which is methyl 10,11-dihydro-5H-dibenz[b,f]azepine-4-carboxylate.

9. The compound according to claim 1 which is 7-chloro 10,11-dihydro-5H-dibenz[b,f]azepine-4-carboxylic acid.

10. The compound according to claim 1 which is 6-methyl-10,11-dihydro-5H-dibenz[b,f]azepine-4-carboxylic acid.

11. The compound according to claim 1 which is 5-(p-chlorobenzoyl)-10,11-dihydro-5H-dibenz[b,f]azepine-4-carboxylic acid.

12. The compound according to claim 1 which is 5H-dibenz[b,f]azepine-4-carboxylic acid.

13. The compound according to claim 1 which is 7-chloro-5H-dibenz[b,f]azepine-4-carboxylic acid.

14. The compound according to claim 1 which is 3,7-dichloro-5H-dibenz[b,f]azepine-4-carboxylic acid.

15. The compound according to claim 1 which is 5-acetyl-10,11-dihydro-5H-dibenz[b,f]azepine-4-carboxamide.

* * * * *